United States Patent
Shimizu

(10) Patent No.: US 9,035,518 B2
(45) Date of Patent: May 19, 2015

(54) BEARING DEVICE FOR SUPPORTING ROTATABLE SHAFT OF ELECTRIC MOTOR

(71) Applicant: ASMO CO., LTD., Kosai, Shizuoka-pref. (JP)

(72) Inventor: Masaaki Shimizu, Toyohashi (JP)

(73) Assignee: ASMO CO., LTD., Shizuoka-pref. (JP)

(*) Notice: Subject to any disclaimer, the term of this patent is extended or adjusted under 35 U.S.C. 154(b) by 178 days.

(21) Appl. No.: 13/671,910

(22) Filed: Nov. 8, 2012

(65) Prior Publication Data
US 2013/0147295 A1    Jun. 13, 2013

(30) Foreign Application Priority Data

Dec. 13, 2011 (JP) ................. 2011-272514

(51) Int. Cl.
*H02K 7/02* (2006.01)
*H02K 7/10* (2006.01)
*H02K 23/60* (2006.01)
*H02K 7/08* (2006.01)
*H02K 5/16* (2006.01)

(52) U.S. Cl.
CPC .............. *H02K 7/083* (2013.01); *H02K 5/16* (2013.01); *H02K 5/161* (2013.01); *H02K 7/081* (2013.01); *H02K 2205/03* (2013.01)

(58) Field of Classification Search
CPC ........... H02K 5/26; H02K 7/116; H01R 39/00
USPC ...... 310/75 R, 80, 83, 92, 96, 98–99, 119, 90
See application file for complete search history.

(56) References Cited

U.S. PATENT DOCUMENTS

| | | | | |
|---|---|---|---|---|
| 5,212,999 A | * | 5/1993 | Kitada | 74/425 |
| 6,700,291 B2 | * | 3/2004 | Uchida et al. | 310/239 |
| 2007/0267923 A1 | * | 11/2007 | Oberle et al. | 310/42 |
| 2008/0245636 A1 | * | 10/2008 | Gotou et al. | 192/48.3 |

FOREIGN PATENT DOCUMENTS

| | | | | |
|---|---|---|---|---|
| JP | 55006065 A | * | 1/1980 | |
| JP | A-H8-196050 | | 7/1996 | |
| JP | A-2002-155930 | | 5/2002 | |
| JP | 2008121781 A | * | 5/2008 | |

* cited by examiner

*Primary Examiner* — Jose Gonzalez Quinones
(74) *Attorney, Agent, or Firm* — Posz Law Group, PLC

(57) ABSTRACT

A radial bearing is received in and is fixed to a bearing receiving portion of a yoke housing, which includes large and small diameter parts, to rotatably support a rotatable shaft. A thrust ball and a thrust plate are received in the bearing receiving portion on an axial side of the radial bearing, which is opposite from the rotatable shaft. The large diameter part receives and holds the radial bearing. The small diameter part holds the thrust ball. The thrust plate is held by an axial end area of the small diameter part.

20 Claims, 6 Drawing Sheets

BEARING DEVICE FOR SUPPORTING ROTATABLE SHAFT OF ELECTRIC MOTOR

CROSS REFERENCE TO RELATED APPLICATION

This application is based on and incorporates herein by reference Japanese Patent Application No. 2011-272514 filed on Dec. 13, 2011.

TECHNICAL FIELD

The present disclosure relates to a bearing device and an electric motor having the same.

BACKGROUND

In general, an electric moor is often used as a drive power source of an onboard apparatus of a vehicle, such as a wiper apparatus, a power seat apparatus or a power window apparatus.

When the electric motor is used as the drive power source of such an onboard apparatus, a thrust load is applied to a rotatable shaft of the electric motor in addition to a radial load.

Therefore, it is necessary to provide a structure that can effectively support the thrust load, which is applied to the shaft of the rotor of the motor, in addition to the radial bearing, which mainly supports the radial load applied to the shaft of the rotor of the motor.

In view of the above need, for example, JPH08-196050A and JP2002-155930A teach structures, which use a thrust ball in a thrust bearing to support the thrust load. The thrust ball reduces the slide loss of the shaft by converting it into rolling friction.

JPH08-196050A teaches a bearing device of a small electric motor.

Specifically, as shown in FIG. 9A, the small electric motor includes a rotor 202 and a side plate 205. A rotatable shaft 203 extends through the rotor 202 and has a rotational central axis.

A conical hole 203c is formed in an end surface of the rotatable shaft 203 made of metal on a side where the side plate 205 is located. A bearing ball 210 made of metal is received in the hole 203c.

The bearing ball 210 is placed to contact the side plate 205 to form a thrust bearing having a pivot bearing structure.

Furthermore, JP2002-155930A teaches the bearing structure of the rotatable shaft of the electric motor.

Specifically, as shown in FIG. 9B, a radial load of an armature shaft 216 of a geared motor is supported by a metal ring 220, and a thrust load of the armature shaft 216 is supported by a thrust ball 232 held in a holding hole 224.

A shaft hole 222 is formed in the metal ring 220 and receives an end portion of the armature shaft 216. Also, the holding hole 224, which is coaxial with the shaft hole 222 and is communicated with the shaft hole 222, is formed in the metal ring 220. The thrust ball 232 is placed in the holding hole 224.

The thrust ball 232 contacts an end surface of the armature shaft 216 received in the shaft hole 222 and is engaged with an inner end surface of a yoke housing 212 through a thrust plate 234.

Therefore, the armature shaft 216 and the thrust ball 232 are rotatable relative to each other to support the thrust load.

As discussed above with reference to JPH08-196050A and JP2002-155930A, when the structure, which uses the radial bearing and the thrust ball, is used, the thrust load can be effectively supported.

However, according to the technique of JPH08-196050A, it is necessary to form the hole 203c, which is configured into the conical shape (having a V-shaped cross section), in the end portion of the shaft 203, and also it is necessary to place the bearing ball 210 in this hole 203c.

The hole 203c is made through a cutting process, so that the shaft 203 needs to be made of a material that can be processed through the cutting process.

Particularly, the material, which has the high rigidity, is difficult to process in the cutting process, and thereby it is difficult to choose such a material for the shaft 203.

Furthermore, when the diameter of the shaft 203 is small, the cutting process of the shaft 203 becomes difficult.

In addition, when the diameter of the shaft is small, the diameter of the thrust ball needs to be small. Therefore, the thrust surface pressure is increased, and thereby there is a disadvantage in terms of the durability.

Furthermore, according to the technique of JP2002-155930A, the metal ring 220, which is the radial bearing, is made relatively large to form the holding hole 224, which holds the thrust ball 232. Thus, the costs are disadvantageously increased.

Also, the installation direction of the metal ring 220, which is the radial bearing, is determined to be a specific direction. Therefore, the assembling of the motor using an automatic assembling machine becomes complicated.

Furthermore, according to this technique, the ball 232 may be dislodged from the holding hole 224 unless the shaft 216 is installed to the metal ring 220, which is the radial bearing. Therefore, there is the difficulty in the terms of handling of such a structure.

Furthermore, a shaft edge and the thrust ball interfere with each other in an inside of the metal ring, which is the radial bearing, to cause generation of noises.

SUMMARY

The present disclosure is made in view of the above disadvantages. Thus, it is an objective of the present disclosure to address at least one of the above disadvantages.

According to the present disclosure, there is provided a bearing device for an electric motor. The bearing device includes a bearing receiving portion, a radial bearing, a thrust ball and a thrust plate. The bearing receiving portion axially outwardly projects from a yoke housing of the electric motor and receives an end portion of a rotatable shaft of the electric motor. The bearing receiving portion is seamlessly and integrally formed with the rest of the yoke housing. The radial bearing is received in and is fixed to the bearing receiving portion. The radial bearing rotatably supports the end portion of the rotatable shaft to support a radial load of the rotatable shaft. The thrust ball and the thrust plate are received in the bearing receiving portion on an axial side of the radial bearing, which is opposite from the rotatable shaft, to support a thrust load of the rotatable shaft. The bearing receiving portion includes a large diameter part, which receives and holds the radial bearing, and a small diameter part, which has an inner diameter smaller than an inner diameter of the large diameter part and holds the thrust ball. The thrust plate is held by an axial end area of the small diameter part on an axial side of the thrust ball, which is axially opposite from the rotatable shaft.

According to the present disclosure, there is also provided an electric motor having an armature and the bearing device discussed above.

BRIEF DESCRIPTION OF THE DRAWINGS

The drawings described herein are for illustration purposes only and are not intended to limit the scope of the present disclosure in any way.

DETAILED DESCRIPTION

First Embodiment

An electric motor M according to a first embodiment of the present disclosure will be described with reference to FIGS. 1 to 4.

The motor M of the present embodiment is similar to a known direct current brush motor except a structure of a bearing device S1 described below.

Figure 1:
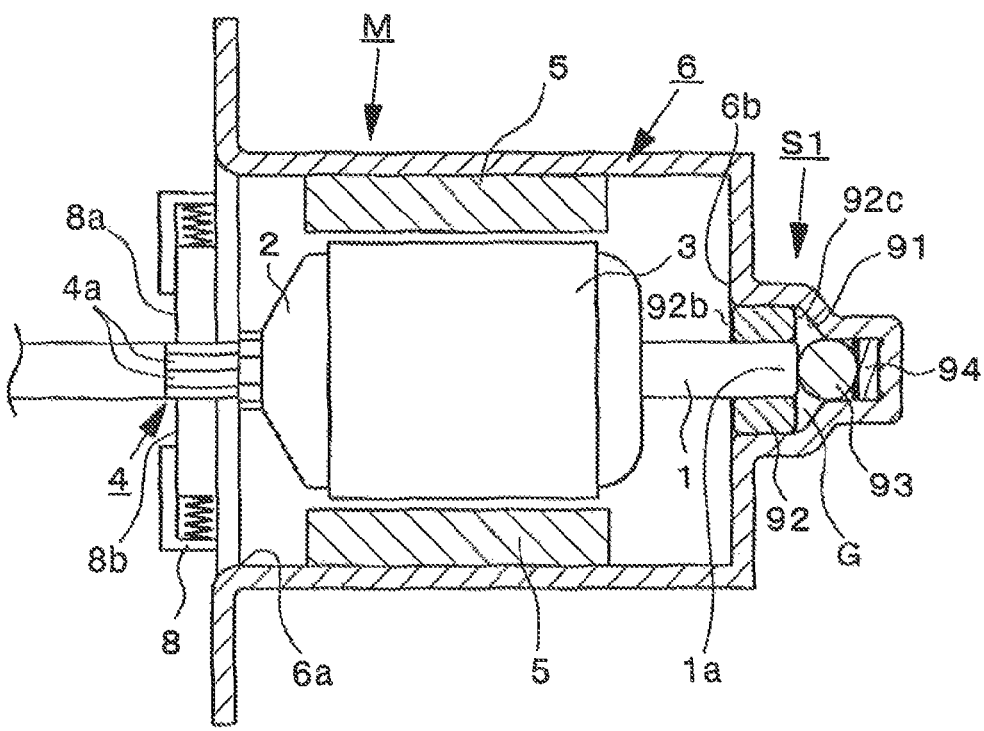
FIG. 1 is a schematic cross sectional view of an electric motor according to a first embodiment of the present disclosure.

As shown in FIG. 1, the motor M of the present embodiment includes a shaft 1, an armature 3, permanent magnets 5, a yoke housing 6 and the bearing device S1.

The shaft 1 is a rotatable shaft, which extends through the armature 3 to rotate integrally with the armature 3 and forms an output shaft of the motor M. Coils 2 are wound around the armature 3. The magnets 5 serve as a magnetic field generating mechanism.

A central axis O (see FIG. 2) of the shaft 1 is a rotational central axis of the armature 3, and the shaft 1 is rotatably supported by the bearing device S1.

Since the bearing device S1 is the main feature of the present disclosure, the details of the bearing device S1 will be described later.

Furthermore, in the present embodiment, the motor M is constructed to rotate about the rotational axis O of the shaft 1.

The armature 3 is fixed to the shaft 1, and the magnets 5 surround the shaft 1.

Furthermore, a commutator 4 is fixed to the shaft 1 on the axial side that is opposite from the bearing device S1.

The commutator 4 is a cylindrical tubular member that is integrally rotatable with the shaft 1 in one direction. The commutator 4 includes a plurality of commutator segments 4a, which are arranged one after another in the rotational direction.

The commutator 4 changes the flow direction of the electric current, which flows through each corresponding coil 2 when brushes 8a, 8b of a brush device 8 sequentially contact different commutator segments 4a one after another upon rotation of the commutator 4.

Furthermore, the brush device 8 supplies the electric current to the coils 2 through the commutator 4. The electric power is supplied to the brush device 8 through pigtails, which extend from the brushes 8a, 8b and are connected to power supply lead wires (not shown).

The yoke housing 6 is a cup shaped member, which is made of metal and receives and covers the armature 3.

The bearing device S1 is formed in an axial bottom portion 6b of the yoke housing 6, which is axially opposite from an opening 6a of the yoke housing 6.

The commutator 4 side of the armature 3 is placed at the opening 6a of the yoke housing 6, and an end portion 1a of the shaft 1, which is opposite from the commutator 4, is rotatably supported by the bearing device S1.

When the motor M is energized, the armature 3 of the motor M is rotated about the central axis O of the shaft 1 due to the repulsive force of the magnets 5 and the electromagnetic force, which is generated by the coils 2 that conduct the electric current. The flow direction of the electric current in each corresponding coil 2 is changed by the commutator 4, as discussed above.

Now, the bearing device S1 will be described in detail.

Figure 2:
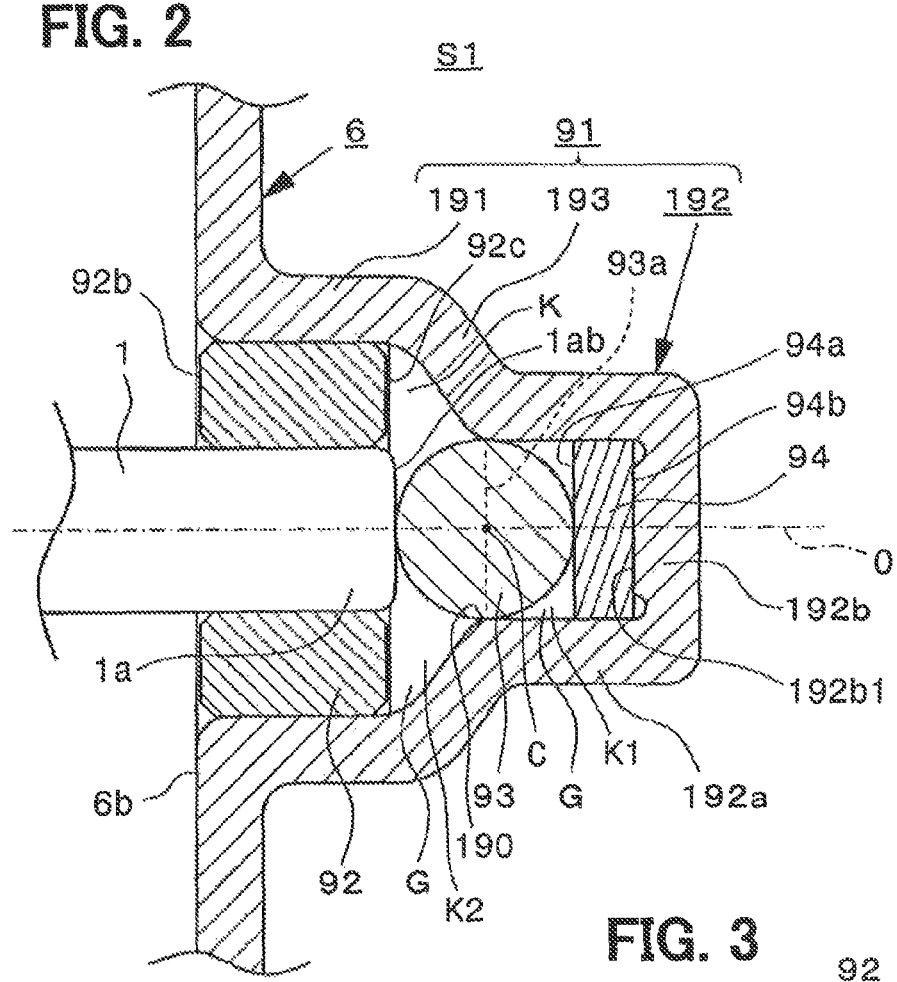
FIG. 2 is a partial enlarged cross sectional view showing a bearing device of the electric motor of the first embodiment.

FIG. 2 is a partial enlarged view of the bearing device S1 of FIG. 1.

The bearing device S1 includes a bearing receiving portion 91, a radial bearing 92, a thrust ball 93 and a thrust plate 94.

In the present embodiment, the bearing receiving portion 91 is formed as an integral portion of the yoke housing 6 and is formed seamlessly with the rest of the yoke housing 6. The bearing receiving portion 91 is configured into a cup form that axially outwardly projects from a center part of the bottom portion 6b, which is axially opposite from the opening 6a of the yoke housing 6.

Thereby, according to the present embodiment, the bearing receiving portion 91 is formed seamlessly and integrally with the yoke housing 6 and is configured to hold the thrust ball 93 therein. Thus, it is not necessary to provide a dedicated component or a dedicated manufacturing step to implement the bearing receiving portion 91, so that the bearing receiving portion 91 of the present embodiment is advantageous in terms of costs.

Specifically, the bearing receiving portion 91 of the bearing device S1 can be implemented only by a drawing process of the yoke housing 6 without requiring any additional member, an additional material or an additional subsequent process.

Therefore, the bearing device S1 of the present embodiment is advantageous in terms of the costs.

Furthermore, unlike the prior art technique, it is not required to complicate the radial bearing configuration (i.e., it is not required to provide, for example, the ball holding portion, i.e., the holding hole in the radial bearing), thereby enabling the low manufacturing costs.

In the present embodiment, the bearing receiving portion 91 is configured as the hollow cup shaped protrusion (having the elongated protruding cross-section that protrudes in the axial direction of the shaft 1), and the bearing receiving portion 91 includes a radial bearing installation part 191, a distal end part (serving as an axial end part) 192 and a stepped part 193. The radial bearing installation part 191 serves as a large diameter part. The distal end part 192 serves as a small diameter part. The stepped part 193 serves as an intermediate diameter part, which has an inner diameter that is smaller than that of the radial bearing installation part 191 (the large diameter part) and is larger than that of the distal end part 192 (the small diameter part).

The radial bearing installation part 191 is configured into a cylindrical tubular form that has the inner diameter slightly larger than the outer diameter of the radial bearing 92, and the radial bearing 92 is directly installed to an inner peripheral wall surface of the radial bearing installation part 191.

The distal end part 192 is configured into a cylindrical tubular form that has a closed bottom end (the right end in FIG. 2) and is coaxial with the radial bearing installation part 191. Also, the Inner diameter of the distal end part 192 is smaller than the inner diameter of the radial bearing Installation part 191.

The distal end part 192 includes a cylindrical peripheral wall 192a and a bottom wall 192b. The cylindrical peripheral wall 192a forms a cylindrical inner peripheral wall surface, and the bottom wall 192b forms an inner wall surface 192b1, which defines an axial end area of the distal end part 192.

The bottom wall 192b of the distal end part 192 is placed to cover a distal end of the distal end part 192, which is furthermost from the opening 6a of the yoke housing 6.

The stepped part 193 is configured to define a hollow truncated cone shaped interior space, which has an inner diameter that is progressively reduced toward the distal end part 192. The stepped part 193 connects, i.e., joins between the radial bearing installation part 191 and the distal end part 192.

With the above construction, the bearing receiving portion 91 is configured as the hollow portion, which has the inner space (i.e., the space having the elongated protruding cross-section) that is defined by the radial bearing installation part 191, the stepped part 193 and the distal end part 192 (more specifically, the cylindrical peripheral wall 192a and the bottom wall 192b of the distal end part 192). The radial bearing installation part 191, the stepped part 193 and the distal end part 192 are joined together seamlessly to close the inner space from an external side of the bearing receiving portion 91 where the surrounding external atmosphere is located.

The radial bearing 92 of the present embodiment is an oil impregnated bearing (an oilless bearing). The radial bearing 92 is configured such that the maximum outer diameter of the radial bearing 92 is slightly smaller than the inner diameter of the radial bearing installation part 191.

In the present embodiment, the radial bearing 92 is made of a sintered alloy, which is formed as follows. Specifically, metal powder is compressed through a compression molding process and is sintered at the temperature, which is equal to or lower than the temperature of the melting point of the metal powder.

Grease G is impregnated into the pores of the sintered metal. The impregnated grease G is supplied to a sliding contact surface between the radial bearing 92 and the shaft 1 through a pumping action caused by the rotation of the shaft 1.

Furthermore, in the present embodiment, a plurality of grooves 92a (three grooves 92a in this embodiment) is formed in an outer peripheral surface of the radial bearing 92.

Figure 3:
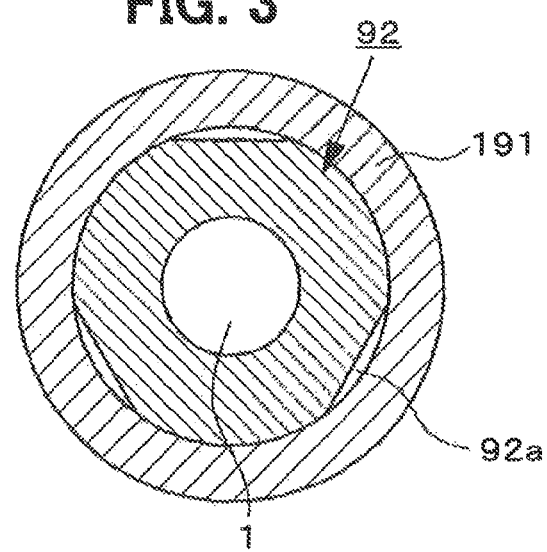
FIG. 3 is a schematic cross sectional view showing grooves formed in a radial bearing of the bearing device according to the first embodiment.

As shown in FIG. 3, the three grooves 92a of the radial bearing 92 are arranged one after another at 120 degree intervals in the circumferential direction about the central axis of the radial bearing 92, which coincides with the central axis O of the shaft 1. Each of the three grooves 92a axially extends through the radial bearing 92 along the outer peripheral surface of the radial bearing 92 to connect between the one axial end surface (the one axial end) 92b and the other axial end surface (the other axial end) 92c of the radial bearing 92.

The number and the configuration of the grooves 92a of the radial bearing 92 are not limited to the above described ones and may be modified to any other number and any other configuration within the scope of the present disclosure.

As discussed above, the radial bearing 92 of the present embodiment includes the grooves 92a, which communicate between the one axial side and the other axial side of the radial bearing 92. Therefore, an interior space K (see FIG. 2), which is axially located on the thrust plate 94 side of the radial bearing 92, does not form a closed sealed space. Thus, it is possible to effectively limit pulling of the grease G out of the radial bearing 92 into the interior space K where the negative pressure is developed upon the occurrence of the depressurization in the interior space K caused by the rotation of the shaft 1. This is due to the fact that the grooves 92a can limit the occurrence of the excessive depressurization in the interior space K by releasing the negative pressure developed in the interior space K through the grooves 92a.

That is, as discussed above, the radial bearing 92 is the oil-impregnated sintered bearing. Therefore, the negative pressure, which is generated by the rotation of the shaft 1, pulls the grease G to the surface of the shaft 1 to lubricate the contact surface between the shaft 1 and the radial bearing 92.

When the interior space K, which is axially located on the thrust ball 93 side of the radial bearing 92 in the bearing receiving portion 91, is formed as the closed sealed space, the grease G is pulled out of the radial bearing 92 into the interior space K. When this phenomenon occurs, the lubrication of the contact surface between the shaft 1 and the radial bearing 92 with the grease G may possibly become insufficient. According to the present embodiment, this lubrication interference is alleviated by the grooves 92a formed in the outer peripheral surface of the radial bearing 92.

Furthermore, when the interior space K, which is axially located on the thrust ball 93 side of the radial bearing 92 in the bearing receiving portion 91, is formed as the closed sealed space, the base oil and/or the impregnated oil of the grease G may possibly be discharged in response to the environmental temperature difference and/or the generated heat temperature difference. However, according to the present embodiment, such a disadvantage can be effectively alleviated.

The thrust ball 93 of the present embodiment is a spherical ball made of copper. The outer diameter of the thrust ball 93 is slightly smaller than the inner diameter of the distal end part 192.

The thrust ball 93 is placed such that an imaginary line 93a of the diameter of the thrust ball 93, which extends through the center C of the thrust ball 93 in the direction perpendicular to the central axis O of the shaft 1, is located in a boundary 190 between the inner peripheral wall surface of the distal end part 192 and the inner peripheral wall surface of the stepped part 193.

Therefore, the strength is improved, and the thrust ball 93 can be reliably held in place.

Furthermore, the thrust plate 94 of the present embodiment is configured as a circular plate. An outer diameter of the thrust plate 94 is slightly smaller than the inner diameter of the distal end part 192 (more specifically, the inner diameter of the cylindrical peripheral wall 192a of the distal end part 192). The shape (the surface area) of the thrust plate 94 substantially coincides with the shape (the surface area) of the inner wall surface 192b1 of the bottom wall 192b of the distal end part 192.

Therefore, the thrust plate 94 is held by the axial end area of the distal end part 192 on one axial side of the thrust ball 93, which is axially opposite from the rotatable shaft 1, such that the thrust plate 94 is fitted to the inner wall surface 192b1 of the bottom wall 192b of the distal end part 192, and an outer end surface 94b of the thrust plate 94 contacts the inner wall surface 192b1 of the bottom wall 192b.

As discussed above, the bearing device S1 includes the bearing receiving portion 91, the radial bearing 92, the thrust ball 93 and the thrust plate 94, which are assembled in a manner shown in FIG. 2.

In the state where the end portion 1a of the shaft 1 is inserted into the radial bearing 92, the radial bearing 92 closes the opening of the radial bearing installation part 191. At this time, the maximum outer diameter of the radial bearing 92 is slightly smaller than the inner diameter of the radial bearing installation part 191, so that the radial bearing 92 is press fitted into the opening of the radial bearing Installation part 191.

Furthermore, the end portion 1a of the shaft 1 slightly axially projects from the end surface (the thrust ball 93 side end surface) 92c of the radial bearing 92 into the inside (the side axially opposite from the commutator 4) of the bearing receiving portion 91.

At this time, the end surface (commutator 4 side surface) 92b of the radial bearing 92, which is located on the side where the commutator 4 is located, is generally flush with an inner surface of the bottom portion 6b of the yoke housing 6.

Furthermore, the outer diameter of the thrust plate 94 is slightly smaller than the inner diameter of the distal end part 192 (more specifically, the inner diameter of the cylindrical peripheral wall 192a of the distal end part 192), so that the thrust plate 94 is fitted to the inner wall surface 192b1 of the bottom wall 192b of the distal end part 192.

The thrust ball 93 is placed between the end portion 1a of the shaft 1 and the thrust plate 94 (more specifically, an inner end surface 94a of the thrust plate 94, which is axially opposite from the inner wall surface 192b1 of the bottom wall 192b).

Figure 4:
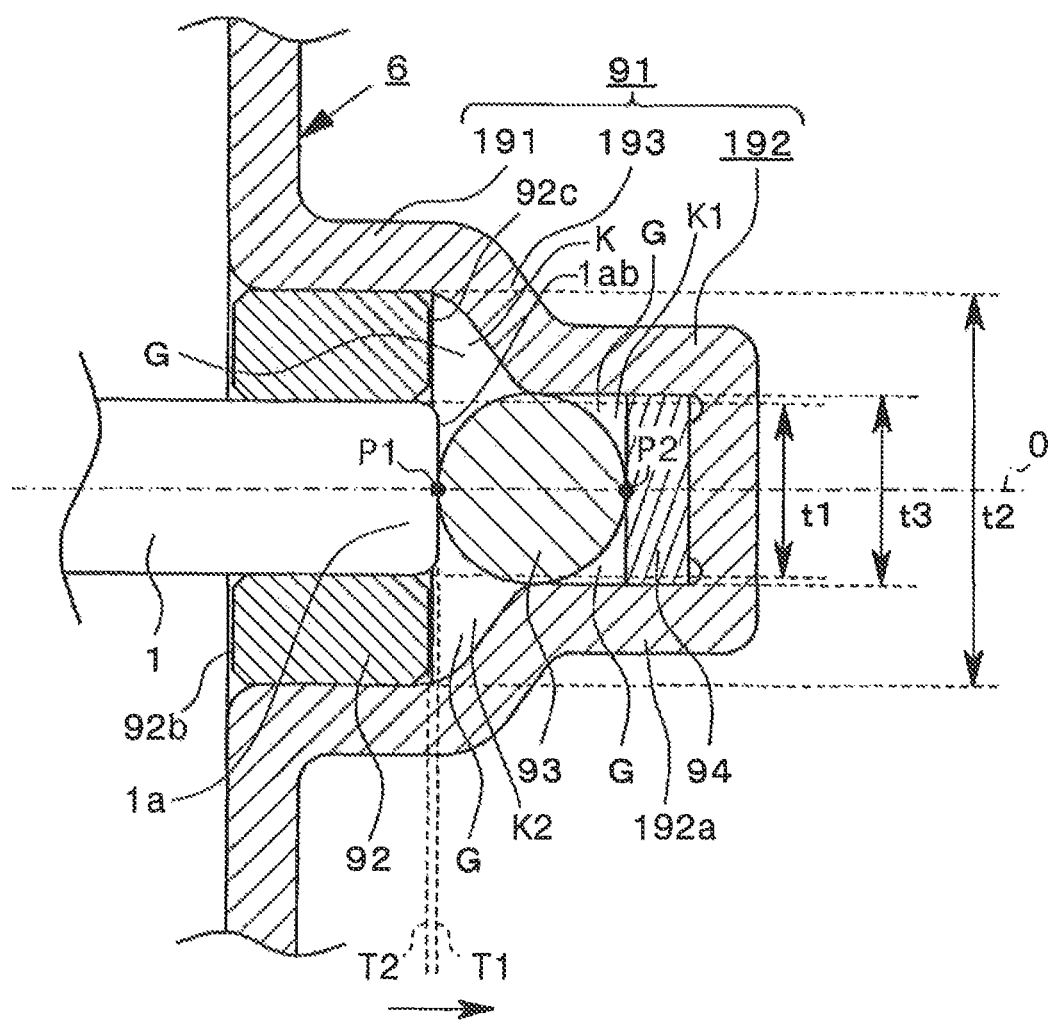
FIG. 4 is a partial enlarged schematic cross sectional view showing sizes of the components of the bearing device of the first embodiment.

The shaft 1 and the thrust ball 93 form a point contact therebetween at a contact point P1 (see FIG. 4). Also, the thrust plate 94 and the thrust ball 93 form a point contact therebetween at a contact point P2. The contact point P1 and the contact point P2 are placed one after another along the central axis O of the shaft 1.

Although the outer diameter of the thrust ball 93 is slightly smaller than the inner diameter of the distal end part 192 (more specifically, the inner diameter of the cylindrical peripheral wall 192a of the distal end part 192), the thrust ball 93 is not press fitted to the inner wall of the distal end part 192. Rather, a small gap is formed between the thrust ball 93 and the inner wall surface of the distal end part 192, and thereby the thrust ball 93 is directly and rotatably (and thereby slidably) held by the distal end part 192. In other words, the thrust ball 93 rotatably (and thereby slidably) contacts the distal end part 192. Thus, it is possible to limit the interference of the rotation of the thrust ball 93.

With reference to FIG. 2, the interior space K is divided into two interior spaces, i.e., two interior subspaces, which will be referred to as first and second interior spaces K1, K2 by the thrust ball 93. The interior space K, more specifically the first and second interior spaces K1, K2 are defined by the end portion 1a of the shaft 1, the end surface 92c of the radial bearing 92, the inner peripheral wall surface of the stepped part 193, the Inner peripheral wall surface of the distal end part 192, the outer peripheral surface of the thrust ball 93 and the thrust plate 94.

Thereby, the sufficient grease lubrication is made possible without requiring a dedicated special structure, thereby improving the durability.

That is, when the radial bearing 92 (having the shaft 1 inserted into the radial bearing 92), the thrust ball 93 and the thrust plate 94 are arranged in place, the first and second interior spaces K1, K2 are naturally formed. Therefore, according to the present embodiment, the first and second interior spaces K1, K2 can be effectively used.

The first interior space K1 is formed on the one axial side of the thrust ball 93 where the thrust plate 94 is located. The first interior space K1 is defined by the thrust ball 93, the thrust plate 94 and the distal end part 192 (the inner peripheral wall surface of the cylindrical peripheral wall 192a of the distal end part 192). The second interior space K2 is formed on the other axial side of the thrust ball 93 where the radial bearing 92 is located. The second interior space K2 is defined by the end surface 92c of the radial bearing 92, the end portion 1a of the shaft 1, the stepped part 193 and the thrust ball 93. Each of the first and second interior spaces K1, K2 holds the grease G. As a result, the sufficient grease lubrication can be achieved to improve the durability.

Next, with reference to FIG. 4, the sizes of the components of the bearing device S1 and the advantages thereof will be described.

The inner diameter t3 of the distal end part 192 is set to be between the Inner diameter t1 of the radial bearing 92 and the outer diameter t2 of the radial bearing 92.

In other words, the inner diameter t3 of the distal end part 192 is set to be larger than the inner diameter t1 of the radial bearing 92 and is smaller than the outer diameter t2 of the radial bearing 92. Specifically, there is the relationship of $t1 < t3 < t2$.

With the above discussed relationship, the outer diameter of the thrust ball 93 can be made larger than the outer diameter of the shaft 1. Therefore, the durability can be improved, and it is possible to withstand the higher load.

Furthermore, a plane T1, in which the end surface (generally planar surface) 1ab of the end portion 1a of the shaft 1 is placed, is located on the interior space K side (the side where the thrust plate 94 is located) of a plane T2, in which the end surface 92c of the radial bearing 92 is placed.

That is, the plane T1 is placed on the axial side of the plate T2 where the interior of the bearing receiving portion 91 is located, i.e., where the thrust ball 93 and the thrust plate 94 are located.

As discussed above, according to the present embodiment, the end portion 1a of the shaft 1 does not interfere with the radial bearing 92.

For example, in a case where the shaft 1 is flexed upon application of the excessive load to the shaft 1, a maximum surface pressure is applied to the end portion 1a of the shaft 1. However, in the present embodiment, the end portion 1a of the shaft 1 axially outwardly projects from the end surface 92c of the radial bearing 92.

Thereby, even when the shaft 1 is flexed, the maximum surface pressure is not applied from the distal end portion 1a of the shaft 1 to the radial bearing 92 since the application point of the maximum surface pressure on the end portion 1a of the shaft 1 is axially projected from the end surface 92c of the radial bearing 92. Therefore, it is possible to limit or avoid the generation of the noise, which would be caused by the insufficiency of the surface pressure strength (i.e., the strength against the surface pressure) of the radial bearing 92.

Second Embodiment

Now, a second embodiment of the present disclosure will be described with reference to FIG. 5.

In the following description, the components, which are similar to those of the first embodiment, will be indicated by the same reference numerals and will not be described redundantly for the sake of simplicity.

The bearing device S2 of the present embodiment is a modification of the bearing device S1 of the first embodiment. In the second embodiment, the distal end part 192 is modified from that of the first embodiment.

Specifically, in the present embodiment, the size of the cylindrical peripheral wall 192c of the distal end part 192 is changed from that of the cylindrical peripheral wall 192a of the distal end part 192 of the first embodiment.

Figure 5:
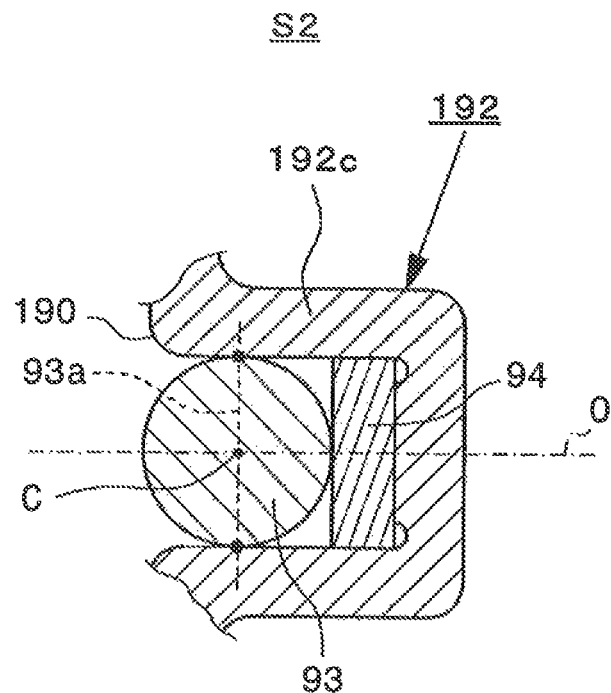
FIG. 5 is a partial enlarged schematic cross sectional view showing a bearing device according to a second embodiment of the present disclosure.

That is, as shown in FIG. 5, the axial length of the cylindrical peripheral wall 192c of the second embodiment measured in the axial direction of the shaft 1 is increased in comparison to the axial length of the cylindrical peripheral wall 192a of the first embodiment.

That is, in the first embodiment, the thrust ball 93 is placed such that the imaginary line 93a of the diameter of the thrust ball 93, which extends through the center C of the thrust ball 93 in the direction perpendicular to the central axis O of the shaft 1, is located in the boundary 190 between the distal end part 192 and the stepped part 193. In contrast, according to the second embodiment, the thrust ball 93 is placed such that the imaginary line 93a of the diameter of the thrust ball 93, which extends through the center C of the thrust ball 93 in the direction perpendicular to the central axis O of the shaft 1, is located within the axial extent of the inner peripheral wall surface of the cylindrical peripheral wall 192c, which is measured along the central axis O of the shaft 1.

In other words, the thrust ball 93 is not held at the boundary 190 between the distal end part 192 and the stepped part 193. Rather, in the second embodiment, the thrust ball 93 is held by the inner peripheral wall surface of the cylindrical peripheral wall 192c. More specifically, the thrust ball 93 is held, i.e., is supported by the inner peripheral wall surface of the cylindrical peripheral wall 192c of the distal end part 192 at an axial intermediate location between two opposed axial ends of the inner peripheral wall surface of the cylindrical peripheral wall 192c.

With this construction, it is possible to more effectively limit the removal of the thrust ball 93 toward the radial bearing installation part 191. Thereby, the thrust load can be stably supported.

Third Embodiment

Now, a third embodiment of the present disclosure will be described with reference to FIG. 6.

In the following description, the components, which are similar to those of the first embodiment, will be indicated by the same reference numerals and will not be described redundantly for the sake of simplicity.

The bearing device S3 of the present embodiment is a modification of the bearing device S1 of the first embodiment. In the third embodiment, the distal end part 192 is modified from that of the first embodiment.

Specifically, in the present embodiment, the size and the shape of the cylindrical peripheral wall 192d of the distal end part 192 are changed from those of the cylindrical peripheral wall 192a of the first embodiment.

Figure 6:
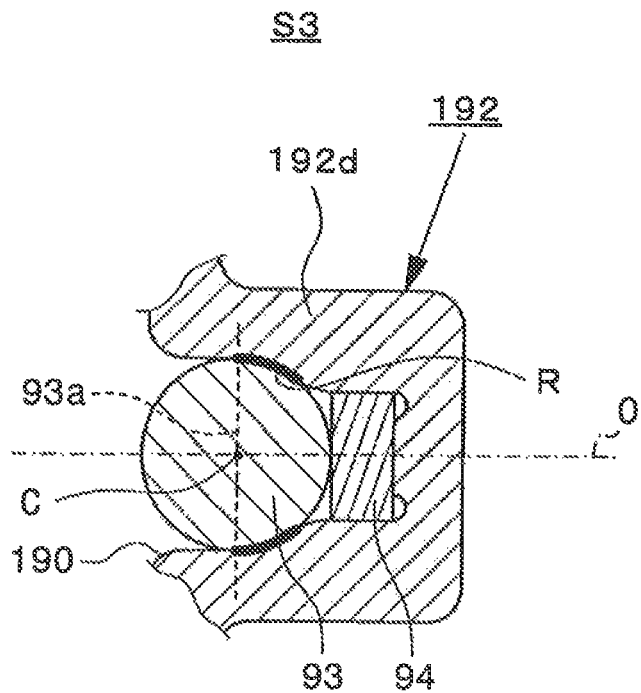
FIG. 6 is a partial enlarged schematic cross sectional view showing a bearing device according to a third embodiment of the present disclosure.

That is, as shown in FIG. 6, the axial length of the cylindrical peripheral wall 192d of the third embodiment measured in the axial direction of the shaft 1 is increased in comparison to the axial length of the cylindrical peripheral wall 192a of the first embodiment, and the shape of the inner peripheral wall surface of the cylindrical peripheral wall 192d is modified from the inner peripheral wall surface of the cylindrical peripheral wall 192a of the first embodiment.

That is, in the first embodiment, the thrust ball 93 is placed such that the imaginary line 93a of the diameter of the thrust ball 93, which extends through the center C of the thrust ball 93 in the direction perpendicular to the central axis O of the shaft 1, is located in the boundary 190 between the distal end part 192 and the stepped part 193. In contrast, according to the third embodiment, the thrust ball 93 is placed such that the imaginary line 93a of the diameter of the thrust ball 93, which extends through the center C of the thrust ball 93 in the direction perpendicular to the central axis O of the shaft 1, is located within the axial extent of the inner peripheral wall surface of the cylindrical peripheral wall 192d.

In other words, the thrust ball 93 is not held at the boundary 190 between the distal end part 192 and the stepped part 193. Rather, in the third embodiment, the thrust ball 93 is held by the inner peripheral wall surface of the cylindrical peripheral wall 192d.

With the above described construction, similar to the second embodiment, it is possible to limit the removal of the thrust ball 93 toward the radial bearing installation part 191, and the thrust load can be stably supported.

Furthermore, in the present embodiment, an arcuate section R is formed in the Inner peripheral wall surface of the cylindrical peripheral wall 192d.

In FIG. 6, the arcuate section R is emphasized to provide the clear understanding.

Specifically, in the present embodiment, the arcuate section R, which substantially coincides with the shape of the outer surface (the shape of the spherical outer surface) of the thrust ball 93, is formed in the inner peripheral wall surface of a portion of the cylindrical peripheral wall 192d, which is located on the thrust plate 94 side. The thrust plate 94 side spherical outer surface of the thrust ball 93 is held by the arcuate section R to make a surface-to-surface contact therebetween while the thrust ball 93 contacts the thrust plate 94, as shown in FIG. 6.

The contact surface area between the arcuate section R and the thrust ball 93 is not limited to this. Specifically, the contact surface area of the arcuate section R is not limited to the one shown in FIG. 6 and may be modified in any other appropriate manner (i.e., the contact surface area between the thrust ball 93 and the arcuate section R may be changed in any appropriate manner).

With the above construction, the contact surface area between the thrust ball 93 and the inner peripheral wall surface of the cylindrical peripheral wall 192d is increased, and thereby the thrust ball 93 can be more stably held.

Fourth Embodiment

Now, a fourth embodiment of the present disclosure will be described with reference to FIGS. 7 to 8B.

In the following description, the components, which are similar to those of the first embodiment, will be indicated by the same reference numerals and will not be described redundantly for the sake of simplicity.

The bearing device S4 of the present embodiment is a modification of the bearing device S1 of the first embodiment. In the fourth embodiment, the radial bearing 95 is modified from the radial bearing 92 of the first embodiment.

A plurality of radial protrusions 95b and a plurality of radial grooves 95a are alternately arranged one after another along the outer peripheral surface of the radial bearing 95 of the present embodiment.

The rest of the structure of the radial bearing 95 of the present embodiment is similar to that of the radial bearing 92 of the first embodiment.

Figure 7:
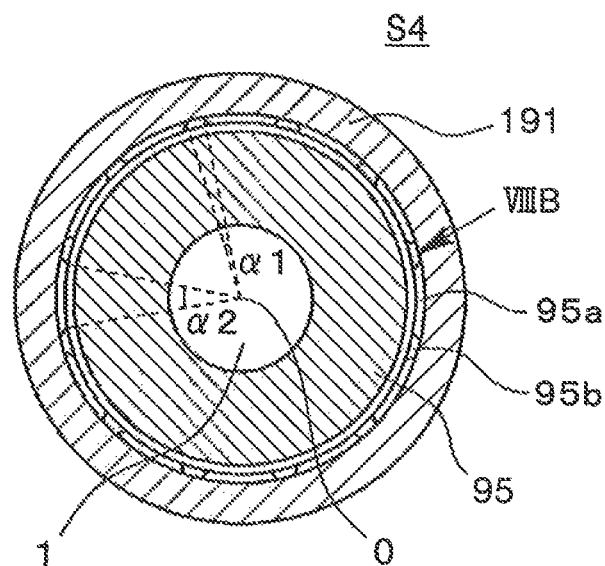
FIG. 7 is a schematic cross-sectional view showing grooves formed in a radial bearing according to a fourth embodiment of the present disclosure.

With reference to FIG. 7, in the present embodiment, the total number of the radial protrusions 95b of the radial bearing 95 is twelve, and these radial protrusions 95b are arranged one after another at 30 degree intervals in the circumferential direction.

Furthermore, the total number of the radial grooves 95a is twelve, and each of these radial grooves 95a is circumferentially interposed between corresponding circumferentially adjacent two of the radial protrusions 95b.

Figure 8A:
FIG. 8A is partial enlarged schematic view showing the grooves formed in the radial bearing according to the fourth embodiment.

FIG. 8A is a partial enlarged view showing the radial protrusions 95b and the radial grooves 95a. FIG. 8B is an enlarged view showing one of the radial protrusions 95b seen in a direction of VIIIB in FIG. 7.

The radial protrusion 95b is generally configured into a truncated quadrangular pyramid form.

Figure 8B:
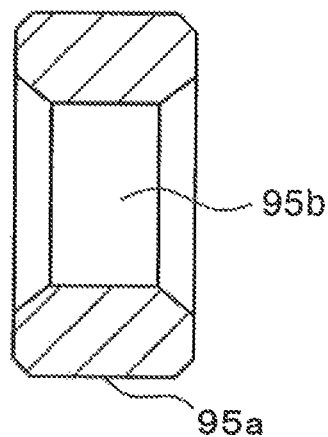
FIG. 8B is a partial enlarged view taken in a direction of an arrow VIIIB in FIG. 7.
Figure 9A:
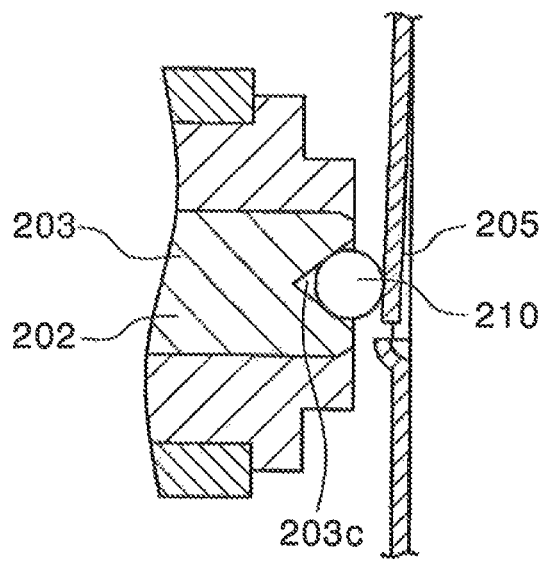
FIG. 9A is a schematic cross-sectional view showing a prior art bearing device.
Figure 9B:
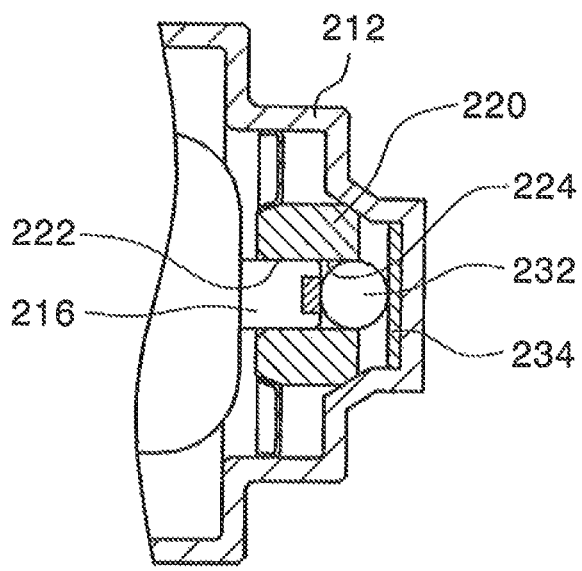
FIG. 9B is a schematic view showing another prior art bearing device.

Each shaded part of FIG. 8B is a cut part. Specifically, this shaded part is cut in a cutting process to form the radial protrusion 95b generally configured into the truncated quadrangular pyramid form.

The space (the cut space that is cut in the cutting process) between each adjacent two radial protrusions 95b forms the radial groove 95a.

Referring back to FIG. 7, in the present embodiment, a circumferential angular extent α2 of each non-contacting area of the radial bearing 92 (i.e., a circumferential angular extent α2 of a non-contacting area of each radial groove 95a), which does not contact the inner peripheral wall surface of the radial bearing installation part 191 and circumferentially extends about the central axis O of the shaft 1 (i.e., the central axis of the radial bearing 95), is larger than a circumferential angular extent a1 of each contact area of the radial bearing 92 (i.e., an angular extent α1 of a contact area of each radial protrusion 95b), which contacts the inner peripheral wall surface of the radial bearing installation part 191 and circumferentially extends about the central axis O of the shaft 1 (i.e., the central axis f the radial bearing 95). That is, there is the relationship of α1<α2.

Therefore, regardless of the processing accuracy, the radial bearing 95 can be more easily fitted to the radial bearing installation part 191.

Therefore, the efficiency of the assembling operation is improved. Also, each of the grooves 95a axially extends along the outer peripheral wall surface of the radial bearing 92 from the one axial end surface (the one axial end) 92b to the other axial end surface (the other axial end) 92c to have the same function as that of the grooves 92a of the first embodiment.

As discussed above, in the bearing device S1-S4 of each of the above embodiments, the bearing receiving portion 91 includes the radial bearing installation part 191, the distal end part 192 and the stepped part 193 and is formed as the part of the bottom portion 6b of the yoke housing 6, which is opposite from the opening 6a.

That is, the bearing receiving portion 91 is formed as the drawn portion of the yoke housing 6, which is formed in the drawing process of the yoke housing 6. Thus, the radial bearing installation part 191, the distal end part 192 and the stepped part 193 of the bearing receiving portion 91 are seamlessly and integrally formed with the rest of the yoke housing 6.

As a result, it is not necessary to provide the additional component or the additional manufacturing step to implement the bearing receiving portion 91, so that the bearing receiving portion 91 is advantageous in terms of costs.

That is, unlike the prior art technique, it is not required to complicate the radial bearing configuration (i.e., it is not required to provide, for example, the ball holding portion, i.e., the holding hole in the radial bearing), thereby enabling the low manufacturing costs.

Furthermore, the grease is filled in the interior spaces K1, K2, which are defined by the radial bearing 92, the thrust ball 93 and the thrust plate 94 in the interior of the bearing receiving portion 91.

As a result, the sufficient grease lubrication is made possible without requiring the dedicated special structure, thereby improving the durability.

The grooves 92a are formed in the radial bearing 92 to limit the formation of the closed sealed space on the thrust ball 93 side of the radial bearing 92 in the bearing receiving portion 91.

Therefore, it is possible to effectively limit the overflow of the grease G, which is caused by the depressurization in the interior space K (K1, K2) on the thrust ball 93 side of the radial bearing 92. Furthermore, it is possible to alleviate the discharge of the base oil and/or the impregnated oil of the grease G, which is caused by the environmental temperature difference and/or the generated heat temperature difference.

Furthermore, a plane T1, in which the end surface lab of the end portion 1a of the shaft 1 is placed, is located on the interior space K side of the plane T2, in which the end surface 92c of the radial bearing 92 is placed.

Therefore, the end portion 1a of the shaft 1 does not interfere with the radial bearing 92. Furthermore, even if the shaft 1 is flexed, the applied maximum surface pressure is not applied from the distal end portion 1a of the shaft 1 to the radial bearing 92. Therefore, it is possible to avoid the generation of the noise, which is caused by the insufficiency of the surface pressure strength of the radial bearing 92.

The inner diameter t3 of the distal end part 192 (the inner diameter t3 of the cylindrical peripheral wall 192a of the distal end part 192) is set to be between the inner diameter t1 of the radial bearing 92 and the outer diameter t2 of the radial bearing 92.

With the above discussed relationship, the outer diameter of the thrust ball 93 can be made larger than the outer diameter of the shaft 1. Therefore, the durability can be improved, and it is possible to withstand the higher load.

Furthermore, in addition to the above discussed advantages, when the size of the distal end part 192 is changed to hold the thrust ball 93 with the inner peripheral wall surface of the distal end part 192, it is possible to effectively limit the removal of the thrust ball 93 toward the interior side of the yoke housing 6, i.e., toward the radial bearing installation part 191, and the thrust load can be stably supported.

Furthermore, the arcuate section R is formed in the Inner peripheral wall surface of the distal end part 192 (the thrust ball 93 holding portion) to hold the thrust ball 93 through the surface-to-surface contact. Therefore, the contact surface area between the inner peripheral wall surface of the distal end part 192 and the thrust ball 93 is increased by the arcuate section R. Thus, the thrust ball 93 can be stably held.

Furthermore, when the structure of each groove 92a of the first embodiment is changed to that of the groove 95a of the fourth embodiment such that the angular extent α2 of each non-contacting area (the non-contacting area of the groove 95a) of the radial bearing 92, which does not contact the inner peripheral wall surface of the radial bearing installation part 191 and circumferentially extends about the central axis O of the shaft 1, is larger than the angular extent α1 of each contact area (the contact area of the protrusion 95b) of the radial bearing 92, which contacts the inner peripheral wall surface of the radial bearing installation part 191 and circumferentially extends about the central axis O of the shaft 1 (implementing the relationship of α1<α2), the efficiency of the assembling operation is improved.

In the above embodiments, the distal end part 192 of the bearing receiving portion 91 serves as the small diameter part of the present disclosure, which holes the thrust ball 93. Alternatively, the distal end part 192 and the stepped part 193 of the bearing receiving portion 91 may collectively serve as the small diameter part of the present disclosure, which holds the thrust ball 93.

In the above embodiments, the grooves 92a, 95a are formed in the outer peripheral surface of the radial bearing 92, 95. Alternatively, one or more grooves may be radially outwardly recessed in the inner peripheral wall surface of the radial bearing installation part 191 to communication the interior space K of the bearing receiving portion 91 with the other side of the radial bearing 92, 95, which is axially opposite from the interior space K. Even with this modification, the advantages discussed in the first embodiment can be achieved.

Additional advantages and modifications will readily occur to those skilled in the art. The present disclosure in its broader terms is therefore not limited to the specific details, representative apparatus, and illustrative examples shown and described.

What is claimed is:

1. A bearing device for an electric motor, comprising:
   a bearing receiving portion that axially outwardly projects from a yoke housing of the electric motor and receives an end portion of a rotatable shaft of the electric motor, wherein the bearing receiving portion is seamlessly and integrally formed with the rest of the yoke housing;
   a radial bearing, which is received in and is fixed to the bearing receiving portion, wherein the radial bearing rotatably supports the end portion of the rotatable shaft to support a radial load of the rotatable shaft; and
   a thrust ball and a thrust plate that are received in the bearing receiving portion on an axial side of the radial bearing, which is opposite from the rotatable shaft, to support a thrust load of the rotatable shaft, wherein:
   the bearing receiving portion includes a large diameter part, which receives and holds the radial bearing, and a small diameter part, which has an inner diameter smaller than an inner diameter of the large diameter part and holds the thrust ball; and
   the thrust plate is held by an axial end area of the small diameter part on one axial side of the thrust ball, which is axially opposite from the rotatable shaft;
   the bearing receiving portion further includes an intermediate diameter part, which joins between the large diameter part and the small diameter part;
   the radial bearing is an oil impregnated bearing;
   an interior space, which is surrounded by an inner peripheral wall surface of the large diameter part, is configured to correspond with a shape of an outer peripheral surface of the radial bearing;
   the radial bearing is fitted into the large diameter part; and
   grease is filled in both of:
      a first interior space, which is located on the one axial side of the thrust ball and is defined by the thrust ball, the thrust plate and the small diameter part; and
      a second interior space, which is located on the other axial side of the thrust ball that is opposite from the one axial side, wherein the second interior space is defined by an end surface of the radial bearing located on an axial side where the thrust plate is located, the end portion of the rotatable shaft, the intermediate diameter part and the thrust ball.

2. The bearing device according to claim 1, wherein:
   the bearing receiving portion is configured into a cup-shaped form that axially outwardly projects from an axial bottom portion of the yoke housing;
   the large diameter part is configured into a generally cylindrical tubular form and seamlessly and continuously extends from the axial bottom portion of the yoke housing;
   the small diameter part is configured into a cup-shaped form and has a bottom wall, which closes the axial end area of the small diameter part;
   the intermediate diameter part is configured to define a hollow truncated cone shaped interior space that has in inner diameter that is progressively reduced toward the small diameter part;
   the large diameter part, the small diameter part and the intermediate diameter part are joined together to close an interior space, which is located in an inside of the large diameter part, the small diameter part and the intermediate diameter part, from an external side of the bearing receiving portion;
   the thrust plate contacts an inner wall surface of the bottom wall of the small diameter part; and
   the thrust ball is rotatably supported at a location between the end portion of the rotatable shaft, which extends through the radial bearing, and an inner end surface of the thrust plate, which is axially opposite from the inner wall surface of the bottom wall of the small diameter part.

3. The bearing device according to claim 1, wherein the end portion of the rotatable shaft axially projects through the radial bearing from an end surface of the radial bearing.

4. The bearing device according to claim 1, wherein the inner diameter of the small diameter part is larger than an inner diameter of the radial bearing and is smaller than an outer diameter of the radial bearing.

5. The bearing device according to claim 1, wherein:
   the thrust ball is supported by an inner peripheral wall surface of a boundary between the intermediate diameter part and the small diameter part.

6. The bearing device according to claim 1, wherein the thrust ball is supported by an inner peripheral wall surface of the small diameter part at an axial intermediate location between two opposed axial ends of the inner peripheral wall surface of the small diameter part.

7. The bearing device according to claim 1, wherein:
   an arcuate section is formed in an inner peripheral wall surface of the small diameter part;
   a shape of the arcuate section substantially coincides with a shape of at least a portion of an outer surface of the thrust ball; and
   the arcuate section supports at least the portion of the outer surface of the thrust ball.

8. A bearing device for an electric motor, comprising:
   a bearing receiving portion that axially outwardly projects from a yoke housing of the electric motor and receives an end portion of a rotatable shaft of the electric motor, wherein the bearing receiving portion is seamlessly and integrally formed with the rest of the yoke housing;
   a radial bearing, which is received in and is fixed to the bearing receiving portion, wherein the radial bearing rotatably supports the end portion of the rotatable shaft to support a radial load of the rotatable shaft; and
   a thrust ball and a thrust plate that are received in the bearing receiving portion on an axial side of the radial bearing, which is opposite from the rotatable shaft, to support a thrust load of the rotatable shaft, wherein:

the bearing receiving portion includes a large diameter part, which receives and holds the radial bearing, and a small diameter part, which has an inner diameter smaller than an inner diameter of the large diameter part and holds the thrust ball;

the thrust plate is held by an axial end area of the small diameter part on one axial side of the thrust ball, which is axially opposite from the rotatable shaft;

the radial bearing is an oil impregnated bearing;

at least one groove axially extends along an outer peripheral surface of the radial bearing and connects between two axially opposed ends of the radial bearing; and a circumferential angular extent of the at least one groove, which does not contact an inner peripheral wall surface of the large diameter part, is larger than a circumferential angular extent of at least one contact part of the outer peripheral surface of the radial bearing, which is located circumferentially adjacent to the at least one groove and contacts the inner peripheral wall surface of the large diameter part.

9. The bearing device according to claim 1, wherein the thrust ball directly and slidably contacts an inner peripheral wall surface of the small diameter part.

10. An electric motor comprising:
an armature; and
the bearing device of claim 1.

11. The bearing device according to claim 8, wherein:
the bearing receiving portion is configured into a cup-shaped form that axially outwardly projects from an axial bottom portion of the yoke housing;
the large diameter part is configured into a generally cylindrical tubular form and seamlessly and continuously extends from the axial bottom portion of the yoke housing;
the small diameter part is configured into a cup-shaped form and has a bottom wall, which closes the axial end area of the small diameter part;
the bearing receiving portion further includes an intermediate diameter part, which joins between the large diameter part and the small diameter part and is configured to define a hollow truncated cone shaped interior space that has in inner diameter that is progressively reduced toward the small diameter part;
the large diameter part, the small diameter part and the intermediate diameter part are joined together to close an interior space, which is located in an inside of the large diameter part, the small diameter part and the intermediate diameter part, from an external side of the bearing receiving portion;
the thrust plate contacts an inner wall surface of the bottom wall of the small diameter part; and
the thrust ball is rotatably supported at a location between the end portion of the rotatable shaft, which extends through the radial bearing, and an inner end surface of the thrust plate which is axially opposite from the inner wall surface of the bottom wall of the small diameter part.

12. The bearing device according to claim 8, wherein the end portion of the rotatable shaft axially projects through the radial bearing from an end surface of the radial bearing, which is located on an axial side where the thrust plate is located.

13. The bearing device according to claim 8, wherein the inner diameter of the small diameter part is larger than an inner diameter of the radial bearing and is smaller than an outer diameter of the radial bearing.

14. The bearing device according to claim 8, wherein:
the bearing receiving portion further includes an intermediate diameter part, which joins between the large diameter part and the small diameter part; and
the thrust ball is supported by an inner peripheral wall surface of a boundary between the intermediate diameter part and the small diameter part.

15. The bearing device according to claim 8, wherein the thrust ball is supported by an inner peripheral wall surface of the small diameter part at an axial intermediate location between two opposed axial ends of the inner peripheral wall surface of the small diameter part.

16. The bearing device according to claim 8, wherein:
an arcuate section is formed in an inner peripheral wall surface of the small diameter part;
a shape of the arcuate section substantially coincides with a shape of at least a portion of an outer surface of the thrust ball; and
the arcuate section supports at least the portion of the outer surface of the thrust ball.

17. The bearing device according to claim 8, wherein:
grease is filled in an interior space of the bearing receiving portion.

18. The bearing device according to claim 8, wherein:
the bearing receiving portion further includes an intermediate diameter part, which joins between the large diameter part and the small diameter part;
an interior space, which is surrounded by an inner peripheral wall surface of the large diameter part, is configured to correspond with a shape of an outer peripheral surface of the radial bearing;
the radial bearing is fitted into the large diameter part; and
grease is filled in both of:
a first interior space, which is located on the one axial side of the thrust ball and is defined by the thrust ball, the thrust plate and the small diameter part; and
a second interior space, which is located on the other axial side of the thrust ball that is opposite from the one axial side, wherein the second interior space is defined by an end surface of the radial bearing located on an axial side where the thrust plate is located, the end portion of the rotatable shaft, the intermediate diameter part and the thrust ball.

19. The bearing device according to claim 8, wherein the thrust ball directly and slidably contacts an inner peripheral wall surface of the small diameter part.

20. An electric motor comprising:
an armature; and
the bearing device of claim 8.

* * * * *